US008832687B2

(12) United States Patent
Baron

(10) Patent No.: US 8,832,687 B2
(45) Date of Patent: Sep. 9, 2014

(54) MANAGING QUOTAS IN A DISTRIBUTED VIRTUALIZATION ENVIRONMENT

(75) Inventor: Ayal Baron, Kiryat Ono (IL)

(73) Assignee: Red Hat Israel, Ltd., Raanana (IL)

( * ) Notice: Subject to any disclaimer, the term of this patent is extended or adjusted under 35 U.S.C. 154(b) by 309 days.

(21) Appl. No.: 13/091,056

(22) Filed: Apr. 20, 2011

(65) Prior Publication Data

US 2012/0272237 A1    Oct. 25, 2012

(51) Int. Cl.
*G06F 9/455* (2006.01)
*G06F 9/50* (2006.01)

(52) U.S. Cl.
CPC .... *G06F 9/45558* (2013.01); *G06F 2009/4557* (2013.01); *G06F 9/5077* (2013.01); *Y02B 60/142* (2013.01); *G06F 9/5011* (2013.01)
USPC .............................................. 718/1; 709/226

(58) Field of Classification Search
None
See application file for complete search history.

(56) References Cited

U.S. PATENT DOCUMENTS

| | | | |
|---|---|---|---|
| 5,446,737 A * | 8/1995 | Cidon et al. .................. | 370/452 |
| 7,716,275 B1 * | 5/2010 | Nagaralu et al. ............. | 709/203 |
| 7,953,701 B2 * | 5/2011 | Okitsu et al. ................. | 707/620 |
| 2003/0182349 A1 * | 9/2003 | Leong et al. .................. | 709/100 |
| 2004/0078532 A1 * | 4/2004 | Tremaine ...................... | 711/160 |
| 2006/0095907 A1 * | 5/2006 | Barsness et al. .............. | 718/100 |
| 2007/0027941 A1 * | 2/2007 | Attila Becker-Szendy et al. ............................. | 707/205 |
| 2008/0103861 A1 * | 5/2008 | Zhong .............................. | 705/8 |
| 2008/0104605 A1 * | 5/2008 | Steinder et al. ............... | 718/104 |
| 2008/0215450 A1 * | 9/2008 | Gates et al. ..................... | 705/26 |
| 2009/0210875 A1 * | 8/2009 | Bolles et al. .................... | 718/1 |
| 2009/0222829 A1 * | 9/2009 | Leong et al. .................. | 718/102 |
| 2010/0306163 A1 * | 12/2010 | Beaty et al. .................... | 706/52 |
| 2011/0138147 A1 * | 6/2011 | Knowles et al. .............. | 711/170 |
| 2012/0059985 A1 * | 3/2012 | Devassy et al. ............... | 711/111 |
| 2012/0066541 A1 * | 3/2012 | Dournov et al. ................ | 714/3 |
| 2012/0230649 A1 * | 9/2012 | Craner et al. ................. | 386/230 |

\* cited by examiner

*Primary Examiner* — Emerson Puente
*Assistant Examiner* — Mehran Kamran
(74) *Attorney, Agent, or Firm* — Lowenstein Sandler LLP

(57) ABSTRACT

A computing device assigns a quota to a entity, the quota specifying a total amount of a low level resource that the entity is permitted to use. The computing device divides the quota into quota portions, and assigns each of the quota portions to one of a plurality of high level resources assigned to the entity. Each of the plurality of high level resources may use low level resources of a plurality of targets. The computing device automatically adjusts quota portions for one or more of the plurality of high level resources in response to changes in utilization requirements of the plurality of high level resources.

21 Claims, 7 Drawing Sheets

MANAGING QUOTAS IN A DISTRIBUTED VIRTUALIZATION ENVIRONMENT

TECHNICAL FIELD

Embodiments of the present invention relate generally to high level resources such as virtual machines. More particularly, embodiments of the present invention relate to techniques for managing low level resource quotas across multiple targets (e.g., for managing storage quotas across multiple storage targets).

BACKGROUND

Enterprises that use virtual machines (VMs) such as virtual desktops for their employees may have many virtual machines (e.g., on the order of 100,000 virtual machines) stored in disk images on shared network storage. To manage storage usage, each user can be assigned a storage quota specifying a total amount of storage space that the user is permitted to use for his VMs. The sum of storage space allotted to all of the user's VMs may not exceed the user's storage quota. The storage quota enables an administrator to know how much of a certain high level resource is consumed, and further enables the administrator to limit the amount of high level resources that individual users can use.

The shared network storage on which disk images are stored may be spread across multiple storage targets (e.g., multiple storage devices, multiple storage clusters, etc.). Additionally, different VMs may be hosted by different host machines, which may or may not be part of a machine cluster. Therefore, a user who has multiple VMs may have VMs that are hosted by different host machines and stored in different storage targets. The user's quota applies to all of the user's virtual machines. Therefore, in conventional systems, the different storage targets and different host machines must be synchronized to ensure that the user does not exceed his storage quota. However, such synchronization consumes network resources and host machine resources, and is typically time consuming to implement and quite complex. Additionally, such synchronization presents difficulties for scalability.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
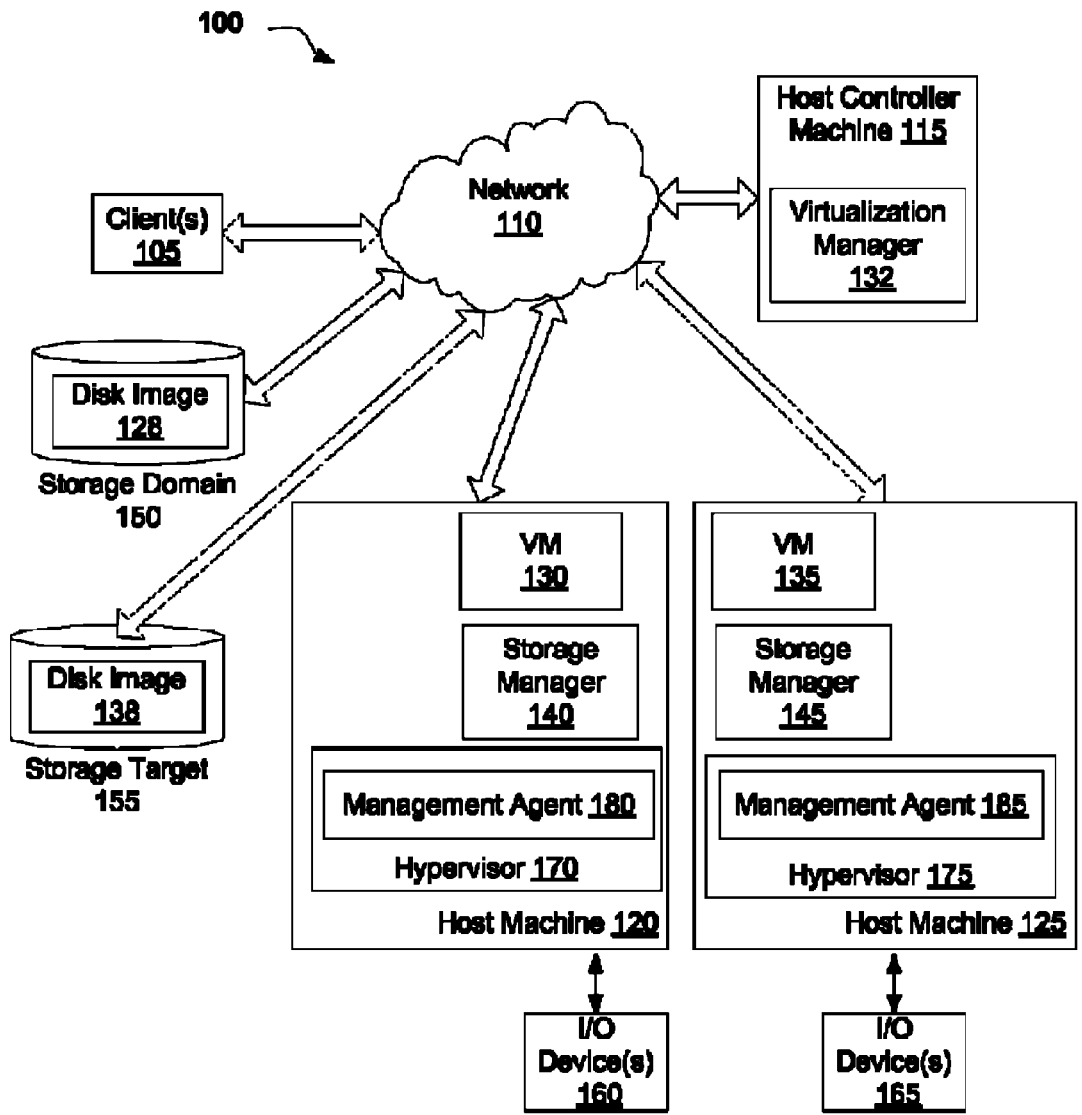
FIG. 1 is a block diagram illustrating an example of a network configuration according to one embodiment of the invention.

Techniques for managing low level resource quotas across multiple targets are described. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

When a user (or other entity) has many high level resources (e.g. virtual machines) spread across multiple hosts, the storage utilization for those high level resources can grow according to use. Allocating additional storage for a high level resource (e.g., a virtual machine) typically requires verification against a storage quota allocated to the user (or other entity). To simplify quota management in a distributed environment, a new mechanism is provided that logically divides the user's/entity's storage quota (or other low level resource quota) between the managed high level resources. When a managed high level resource is in use on a host machine, that host machine can allocate additional storage (or other low level resources) as needed up to the amount set aside for this high level resource. Once this limit is reached, the user or a host controller machine would either have to allocate additional space from the user's storage quota (which would be communicated to the host machine) or no more storage space would be available for this high level resource. If the user or host controller machine needs to reclaim any portion of storage quota allotted to a specific high level resource, then that too would be communicated to the host machine managing the high level resource, and the host machine would reduce the quota as needed (but not below actual space used). Once the host machine stops managing the high level resource, then any remaining unused storage quota can be redistributed to other high level resources that the user has. The same principles apply for other types of low level resources.

Note that embodiments of the present invention are described with relation to storage quotas being assigned to users. However, it should be understood that storage quotas may also be assigned to other entities, such as groups of users. Quotas may be managed, for example, at the user level, at the group level (where a group contains multiple users), or at some other level not associated with a user.

Additionally, embodiments of the present invention are described with reference to storage quotas. However, other types of low level resource quotas may also be used in embodiments of the present invention. For example, embodiments of the present invention may manage low level resource quotas such as processor utilization quotas, memory utilization quotas, bandwidth utilization quotas, and so forth. For example, if in a cloud environment, a customer buys compute resources, these resources can be limited using quotas. A concrete example would be that a customer "rents" 10 GB of memory and 10 hours of 1 CPU time. This customer could run 1 VM with 10 GB of memory on a single host or could run 10 VMs on 10 different hosts with 1 GB of memory (hard limit via cgroups). If during run time, VM1 needs more memory on host A and VM2 on host B does not utilize the entire capacity it has been given, we can further limit memory of VM2 and increase memory of VM1 (same applies to CPU or any other host level resource). For the sake of simplicity, the following description uses storage quotas as an example of a low level resource quota. However, it should be understood that embodiments of the present invention may be equally applied to other types of low level resources.

According to one embodiment of the present invention, a computing device assigns a storage quota to a user, the storage quota specifying a total amount of storage space that the user is permitted to use for multiple storage targets. A storage target may be a storage device, a storage array, a logical unit number (LUN), a database, or other storage entity. In one embodiment, the user may be allocated several storage quotas from different storage quota pools. This means that the same user might have multiple storage quotas defined depending on the storage type. For example the user may have a first storage quota for high-end (e.g., solid state) storage and a second storage quota for a low-end storage. Note that if quotas for other types of low level resources than storage are managed, then the quota would specify the total amount of that low level resource that the user is permitted to use on multiple targets (which may or may not be storage targets). The targets may be real machines or virtual machines that include or have access to memory, processors, storage, etc.

The computing device divides the storage quota into storage quota portions, and assigns each of the storage quota portions to a different high level resource assigned to the user. Each of the high level resources is stored in one of the multiple storage targets. In one embodiment, the computing device receives a command to start a specified high level resource. The computing device determines whether to change a size of the specified high level resource's storage quota portion before starting the specified high level resource. Additionally, other events may cause the computing device to determine whether to change sizes of one or more specified high level resource's storage quota portions. In one embodiment, the computing device monitors storage usage and automatically adjusts storage quota portions for high level resources as the storage utilization of those high level resources changes. In one embodiment, the determination of whether to change a high level resource's storage quota portion is made based on historical storage usage data for the specified high level resource and/or historical storage usage data for the user's other high level resources. Upon determining to change the size of the specified high level resource's storage quota portion, the computing device determines a new size for the specified high level resource's storage quota portion, and sets the size of the specified high level resource's storage quota portion to the determined size. For example, if the historical usage data indicates that the specified high level resource will need more storage capacity, the size of that high level resource's storage quota portion is increased.

FIG. 1 is a block diagram illustrating an example of a network configuration 100 according to one embodiment of the invention. Network configuration 100 includes, but is not limited to, one or more clients 105 communicatively coupled to a host controller machine (host controller) 115 and/or a host machine or machines (hosts) 120, 125 via a network 110. Network 110 may be a private network (e.g., a local area network (LAN) or a wide area network (WAN)), a public network (e.g., the Internet), or a combination of one or more networks.

Each host machine 120, 125 may be a computing device configured to host high level resources. The host machines 120, 125 may be personal computers (PCs), server computers, mainframes, or other computing systems. The host machines 120, 125 may have a bare platform hardware that can include a processor, memory, input/output devices, etc. Each host machine 120, 125 may be a single machine or multiple host machines arranged in a cluster.

In the illustrated embodiment, the high level resources hosted by the host machines 120, 125 are virtual machines 130, 135. However, the host machines 120, 125 may host other high level resources such as applications, files, etc. instead of or in addition to virtual machines 130, 135. In one embodiment, each of the hosted high level resources (e.g., VMs 130, 135) is associated with a specific user.

In the illustrated embodiment (in which the host machines 120, 125 host virtual machines 130, 135), the host machines 120, 125 include a hypervisor 170, 175 (also known as a virtual machine monitor (VMM)). The hypervisor 170, 175, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The hypervisor 170, 175 presents to other software (i.e., "guest" software) the abstraction of one or more virtual machines (VMs) 130, 135, which may provide the same or different abstractions to various guest software (e.g., guest operating system, guest applications, etc.).

A virtual machine 130, 135 is a combination of guest software that uses an underlying emulation of a hardware machine (e.g., as provided by a hypervisor). The guest software may include a guest operating system, guest applications, guest device drivers, etc. Virtual machines 130, 135 can be, for example, hardware emulation, full virtualization, para-virtualization, and operating system-level virtualization virtual machines. In one embodiment, each virtual machine 130, 135 hosts or maintains a desktop environment providing virtual desktops for remote clients (e.g., client 105) and/or local clients (e.g., that use attached input/output devices 160, 165). A virtual desktop is a virtualized desktop computer, and thus may include storage, an operating system, applications installed on the operating system (e.g., word processing applications, spreadsheet applications, email applications, etc), and so on. However, rather than these functions being provided and performed at the client 105, they are instead provided and performed by a virtual machine 130, 135. A virtual desktop can represent an output (e.g., an image to be displayed) generated by a desktop application running within a virtual machine. Graphics data associated with the virtual desktop can be captured and transmitted to a client 105, where the virtual desktop may be rendered by a rendering agent and presented by a client application (not shown). In other embodiments, virtual machines are not virtual desktops.

Each host machine 130, 135 is connected with a particular storage target via network 110 or via a separate network dedicated solely to storage connections (not shown). Each storage target 150, 155 may be a network storage device or collection of network storage devices (e.g., which may be arranged in an array such as a RAID array) that can be accessed by multiple hosts. These network storage devices may be block-level devices (e.g., a storage area network (SAN) device), file-level devices (e.g., a network attached storage (NAS) device), or a combination of both. storage targets 150, 155 may by logical domains that span multiple storage devices or arrays, which may be geographically disperse. Additionally, a single storage device or combination of storage devices may include multiple logical storage targets. Additionally, each storage target may have different geographic locations, and/or may be managed by different host machines.

Some host machines include a storage manager 140, 145 that manages the storage target that the host machine is connected to. For example, host machine 120 includes a storage manager 140 that manages storage target 150 and host machine 125 includes a storage manager 145 that manages storage target 155. The storage manager 140, 145 may be responsible for receiving instructions from virtual machines that are meant for the managed storage target 150, 155, and performing operations on data in the storage target 150, 155 based on the instructions. The instructions may be received from VMs on the host hosting the storage manager, from VMs on other hosts and/or from the host controller machine 115.

In one embodiment, in which the host machines 120, 125 host virtual machines, the storage targets store disk images 128, 138. Each disk image 128, 138 is a file or collection of files that is interpreted by hypervisors 170, 175 as a hard disk. The disk image 128, 138 may encapsulate a virtual machine 130, 135, which may include an OS, installed applications, directory structure, files, etc. for the VM. The hypervisor 170, 175 loads the VMs 130, 135 by mounting the disk images 128, 138 and starting the OS included in the disk image 128, 138. Each disk image 128, 138 occupies some amount of storage space on the storage target 150, 155. The copy of the disk image 128, 138 stored in the storage target 150, 155 is a definitive up-to-date copy for the virtual machine 130, 135. Accordingly, whenever a VM 130, 135 is to be started, the host machine 120, 125 that will host the VM 130, 135 accesses the storage target 150, 155 to load the VM 130, 135 from the disk image 128, 138. As files are added to a virtual machine 130, 135, applications are installed on the virtual machine 130, 135, etc., the amount of storage space occupied by the disk image 128, 138 increases. Note that the high level resource (e.g., VM) itself might not reside on a particular storage target, but may have data stored thereon. For example, a VM may have multiple disk images on different storage targets and the VM metadata might be stored in a central DB.

The host machines 120, 125 may be coupled to host controller machine 115 (via network 110 as shown or directly). The host controller machine 115 may monitor and control one or more functions of host machines 120, 125. In one embodiment, the host controller machine 115 includes a virtualization manager 132 that manages virtual machines 130, 135. The virtualization manager 132 may manage one or more of provisioning of new virtual machines, connection protocols between clients and virtual machines, user sessions (e.g., user authentication and verification, etc.), backup and restore, image management, virtual machine migration, load balancing, storage quota allocation, and so on. Virtualization manager 132 may, for example, add a virtual machine, delete a virtual machine, balance the load on a host machine cluster, assign a portion of a user's storage quota to a virtual machine 130, 135, and/or perform other management functions. The virtualization manager 132 in one embodiment acts as a front end for the host machines 120, 125. Thus, clients 105 and/or I/O devices 160, 165 log in to the virtualization manager 132, and after successful login the virtualization manager 132 connects the clients or I/O devices 160, 165 to virtual machines 130, 135. This may include directing the host machine 120, 125 to load a VM 130, 135 for the client 105 or I/O device 160, 165 to connect to. In another embodiment, clients 105 and/or I/O devices 160, 165 directly access the host machines 120, 125 without going through virtualization manager 132.

Users may have multiple VMs (and/or other high level resources), each of which uses some portion of storage space in a storage target 150, 155. In one embodiment, virtualization manager 132 assigns a storage quota to each user. The storage quota specifies the maximum amount of storage space that the user's VMs (or other high level resources) are allowed to use for all storage targets. For example, if the user has a storage quota of 50 GB and two VMs 130 and 135, then VM 130 (associated with disk image 128) and VM 135 (associated with disk image 138) may together use a total of 50 GB. To simplify management of the storage quota, virtualization manager 132 divides the storage quota into storage quota portions. Each of the storage quota portions is assigned to one of the user's VMs (or other high level resources). The virtualization manager 132 then informs the host machine that hosts each VM of that VM's storage quota portion.

In one embodiment, hypervisors 170, 175 include a management agent 180, 185. Management agents 180, 185 interact with virtualization manager 132 to manage virtual machines 130, 135. In one embodiment, management agents 180, 185 receive storage quota portion information from virtualization manager 132. The management agent 180, 185 may then monitor the amount of storage space used by the VMs hosted by the host machine 120, 125 on which it runs. Once the management agents 180, 185 receive the storage quota portion information, they may manage the storage quotas for local VMs without any need to synchronize with other host machines or the virtualization manager 132. This may reduce overhead and network traffic. In one embodiment, if a VM is close to reaching its allocated storage quota portion, the management agent 180, 185 reports this to the virtualization manager 132 and requests allocation of additional storage space (an increase in the storage quota portion size for that VM).

In one embodiment, virtualization manager 132 determines a storage quota portion size for a VM. Upon receiving a request to start that VM, the virtualization manager 132 may determine a size for the VM's storage quota portion automatically or based on user input. In one embodiment, the VM starts with a storage quota portion having a size that approximately equals the amount of storage space actually taken up by the VM. Alternatively, the VM may have a storage quota portion size that was previously assigned to it. Setting the size of the user's storage quota portion may include assigning storage space from a free storage pool to the VM's storage quota portion. The free storage pool identifies how much of the user's storage quota is unassigned.

In one embodiment, upon the host shutting down or suspending the VM, the virtualization manager 132 reduces that VM's storage quota portion to the amount of space actually used by the VM (e.g., the amount of storage space taken up by the VM's disk image). The freed storage space may then be added to the user's free storage pool so that it can be assigned to another VM if necessary.

In one embodiment, a thin provisioning storage allocation technique is used for the VMs. The thin provisioning storage allocation technique is a technique for using storage in which a minimum amount of storage is used for a VM. When thin provisioning is used, from the VMs perspective it has a large amount of storage space available (e.g., 1 TB), even though only a small portion of storage space is actually used for the VM. As the VM attempts to use more storage space, additional storage space is allocated to the VM on demand. When thin provisioning is used, the VM's storage quota portion represents the amount of storage space that is reserved for the VM, but typically does not represent the amount of actual storage space that the VM is given. Thin provisioning optimizes the utilization of available storage.

In one embodiment, users access virtual machines 130, 132 remotely via clients 105. Alternatively, users may access virtual machines 130, 132 locally via terminals and/or input/ output devices 160, 165 such as a mouse, keyboard and monitor. In one embodiment, virtual machines 130, 135 communicate with clients 105 using a multichannel protocol (e.g., Remote Desktop Protocol (RDP), Simple Protocol for Independent Computing Environments (SPICE™ from Red Hat®), etc.) that allows for connection between the virtual machine and end-user devices of the client 105 via individual channels.

Each client 105 may be a personal computer (PC), palm-sized computing device, personal digital assistant (PDA), etc. Clients 105 may be fat clients (clients that perform local processing and data storage), thin clients (clients that perform minimal or no local processing and minimal to no data storage), and/or hybrid clients (clients that perform local processing but little to no data storage). In one embodiment, clients 105 essentially act as input/output devices, in which a user can view a desktop environment provided by a virtual machine 130, 135 (e.g., a virtual desktop) on a monitor, and interact with the desktop environment via a keyboard, mouse, microphone, etc. In one embodiment, a majority of the processing is not performed at the clients 105, and is instead performed by virtual machines 130, 135 hosted by the host machines 120, 125.

Figure 2A:
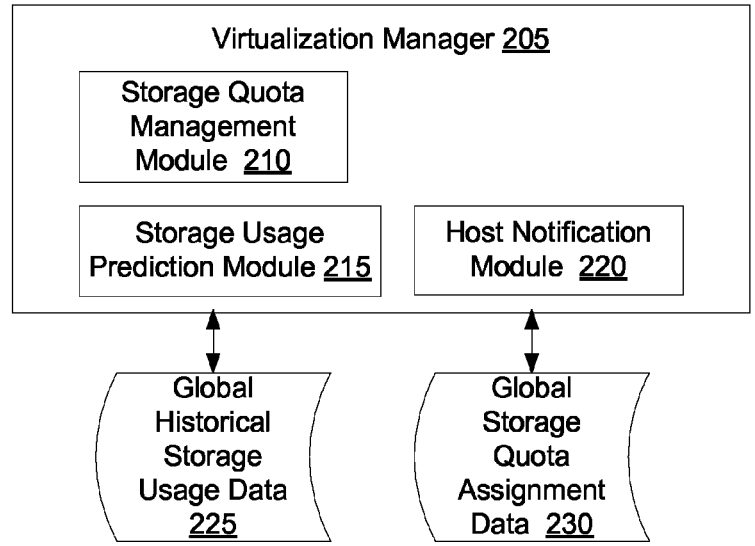
FIG. 2A is a block diagram illustrating one embodiment of a virtualization manager.

FIG. 2A is a block diagram illustrating one embodiment of a virtualization manager 205. In one embodiment, the virtualization manager 205 corresponds to virtualization manager 132 of FIG. 1. As described above, the virtualization manager 205 manages virtual machines, which includes performing actions such as provisioning new virtual machines, connecting clients to virtual machines, and managing user's storage quotas. In one embodiment, the virtualization manager 205 includes a storage quota management module 210, a storage usage prediction module 215 and a host notification module 220.

Storage quota management module 210 manages users' storage quotas. This may include allocating a storage quota to a user, dividing the storage quota into storage quota portions, and assigning the storage quota portions to different high level resources (e.g., virtual machines) associated with the user. Managing storage quotas may also include adjusting the sizes of the storage quota portions.

Different users may have different storage quotas. In one embodiment, there are multiple user types, each of which has a predefined storage quota. When an account for a new user is generated, an administrator may select a user type for the new user, which causes the new user to have a particular predefined storage quota. Alternatively, the administrator may select a personalized storage quota for that user.

A user may have multiple high level resources that are managed by one or multiple hosts. A separate storage quota portion is generated for each of the separate high level resources. The user's total storage quota is then divided between the multiple storage quota portions. If not all of the user's storage quota is assigned to the high level resources, a free storage pool may be maintained. As the user adds new high level resources (e.g., VMs), additional storage quota portions are created. If there is any space in the free storage pool, then some or all of the free storage pool may be assigned to the new high level resource. If the free storage pool is empty or has insufficient capacity, one or more of the already assigned storage quota portions may be reduced in size (assuming that it is not fully utilized), and the new storage quota portion may be increased in size.

The virtualization manager 205 maintains a record of all global storage quota assignment data 230. This may include both the total storage quota assigned to each user, as well as the storage quota portions into which the storage quota has been divided and the size of the user's free storage pool. The global storage quota assignment data 230 may include storage quota portions assigned to multiple high level resources hosted by different machines and/or stored in different storage targets. The global storage quota assignment data may include information on amounts of storage space actually used by each high level resource, and thus the unused portion of each storage quota portion. In one embodiment, while a high level resource is inactive (e.g., not currently running on a host machine), the size of the high level resource's storage quota portion is reduced to the amount of storage space actually used by the high level resource. Once the high level resource is started, the size of the high level resource's storage quota portion may be increased according to high level resource type and policy (e.g. a pre-allocated disk image's quota need not be increased beyond actual size). Alternatively, the size of a storage quota portion may not be reduced until another high level resource needs additional storage space.

Whenever a new high level resource is generated and assigned a storage quota portion, or when the size of an existing storage quota portion is changed by the storage quota management module 210, the host notification module 220 notifies an appropriate host of the new storage quota portion or of the storage quota portion change.

Virtualization manager may maintain a log of global historical usage data 225 for some or all high level resources. The global historical usage data 225 may show the amount of actual storage space used by each particular high level resource over the life of that high level resource. The global historical usage data 225 may also include computed statistics such as average increase in the actual storage space used for a high level resource over time (e.g., per session, per day, etc.).

In one embodiment, storage usage prediction module 215 uses the global historical storage usage data 225 for a high level resource to determine the future storage space needs for that high level resource. For example, when a high level resource is to be started up, the storage usage predication module 215 may use the global historical storage usage data 225 for that high level resource to compute the amount of storage space that will likely be needed for that high level resource in the next session that is to begin. The storage quota management module 210 may compare the predicted needed storage space with the storage quota portion assigned to that high level resource. If the size of the storage quota portion assigned to that high level resource is not large enough, the storage quota management module 210 may increase its size prior to the high level resource being started.

Storage usage prediction module 215 may also compute predicted storage usages for other active or inactive high level resources assigned to the user of the current high level resource that is to be started. Storage usage prediction module 215 may then determine whether any of the active or inactive high level resources have excess storage capacity. If the current high level resource that is to be started needs a larger storage quota portion, then the excess capacity of one or more of the other high level resources may be reassigned to the current high level resource that is to be started. The determination of which storage quota portions to increase and which storage quota portions to decrease may be performed automatically by the storage quota management module 210 and storage usage prediction module 215 without any user input. Alternatively, a user may specify that the sizes of storage quota portions for specific high level resources be increased and/or decreased.

Figure 2B:
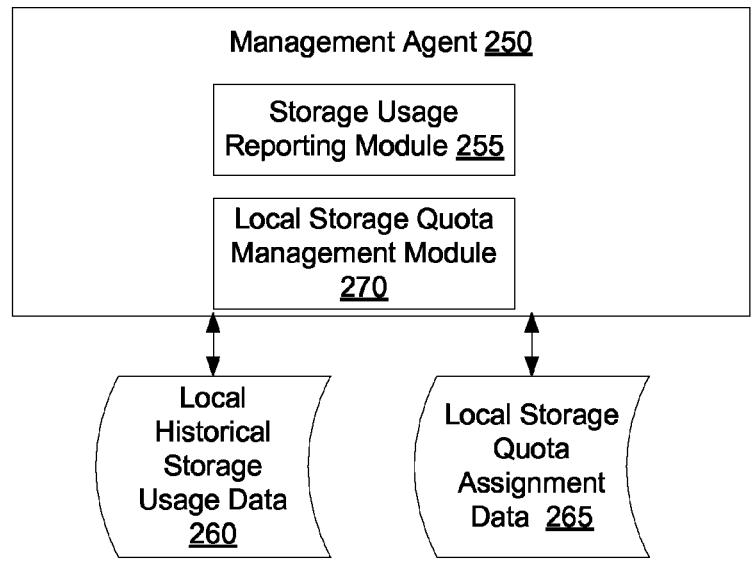
FIG. 2B is a block diagram illustrating one embodiment of a management agent.

FIG. 2B is a block diagram illustrating one embodiment of a management agent 250. In one embodiment, the management agent 250 corresponds to management agents 180, 185 of FIG. 1. The management agent 250 manages the high level resources hosted by a host machine on which the management agent 250 operates. This may include starting and stopping high level resources, as well as controlling the size of each high level resource's storage quota portion. The management agent 250 may receive instructions to increase or decrease the sizes of storage quota portions for one or multiple high level resources managed by the management agent 250. In response, the local storage management module 270 increases or decreases the size of one or more storage quota portions for local high level resources. The changes may then be recorded in local storage quota assignment data 265.

The management agent 250 maintains a record of local storage quota assignment data 265. The local storage quota assignment data 265 may include storage quota portions assigned to each of the high level resources that the management agent 250 manages (each of the high level resources hosted by the local host machine). The management agent 250 may also record local historical storage usage data for the local high level resources.

In one embodiment, the management agent 250 includes a storage usage reporting module 255 that reports the local historical storage usage data 260 to the virtualization manager 205. The storage usage reporting module 255 may also request to the virtualization manager 205 that the size of a storage quota portion for a managed high level resource be increased if the managed high level resource's actual storage usage is at or near the storage quota portion.

In one embodiment, the management agent 250 includes a local storage quota management module 270. The local storage quota management module 270 may reassign storage quota portion sizes between local high level resources that are shared by a single user. Therefore, the management agent 250 may attempt to reallocate storage quota portions locally without sending out a request to the virtualization manager 205. Such a reallocation would then be reported by the storage usage reporting module 255 to the virtualization manager 205. However, the reallocation may not need to be reported immediately. Therefore, the reallocation of the storage quota portions may be reported to the virtualization manager 205 when a more urgent message is already being sent to the virtualization manager 205 (e.g., requesting additional storage space for a high level resource). If the user only has a single high level resource that is managed by the particular management agent 250, or if the user has multiple high level resources, but none of those high level resources have available capacity to reassign, the storage usage reporting module 255 may send a request to the virtualization manager 205 for additional storage space for one or more of its managed high level resources.

The management agent 250 may receive a request to start a high level resource from a virtualization manager or directly from a client or input/output device. If the request is received from the virtualization manager, the request may include a new storage quota portion size to use for the high level resource. If the request is received from a client or input/output device, the management agent 250 may send a message to the virtualization manager notifying it that a request to start the high level resource has been received. The message may include a query regarding the high level resource's storage quota portion allocation. The virtualization manager may respond with an amount of storage to use for the high level resource's storage quota portion.

Figure 3:
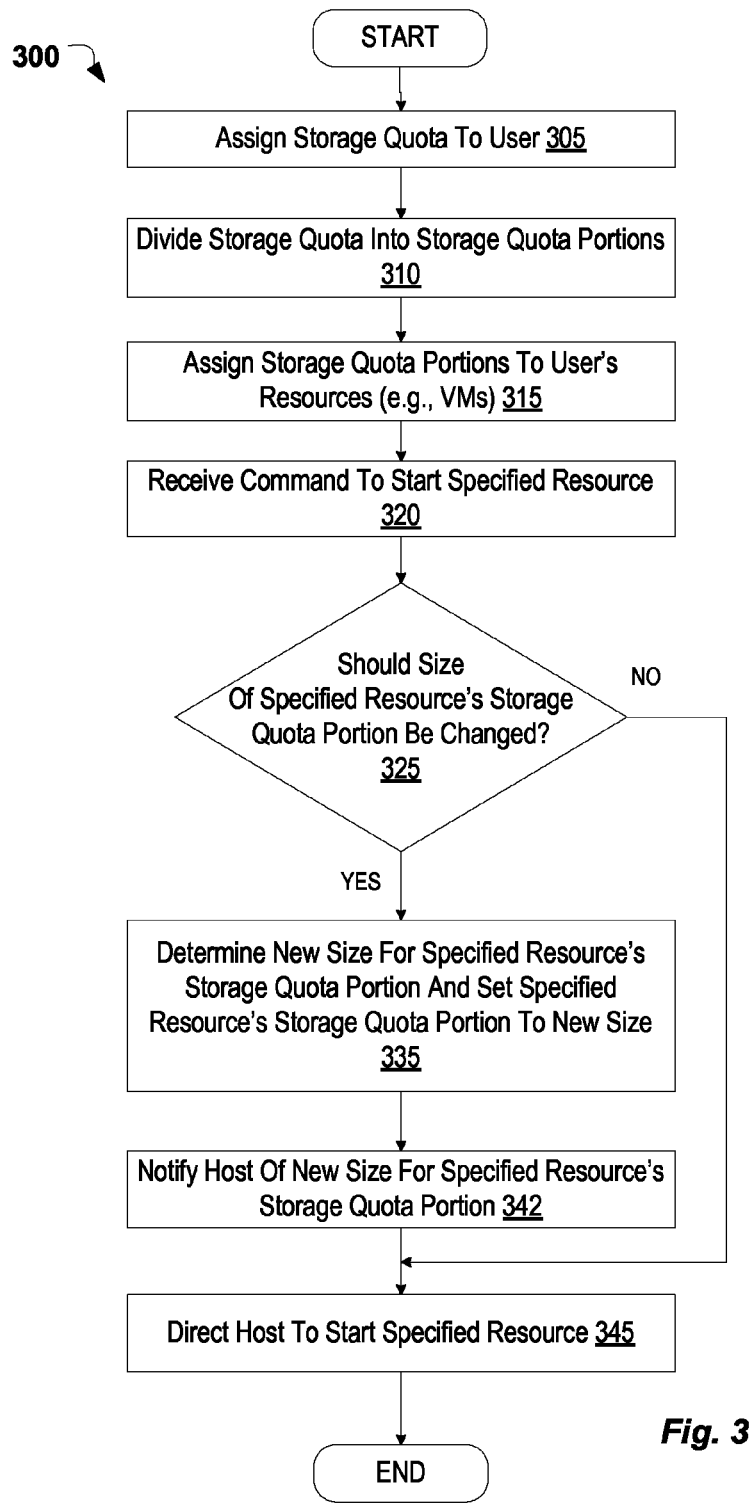
FIG. 3 is a flow diagram illustrating one embodiment for a method of managing a user's storage quota.

FIG. 3 is a flow diagram illustrating one embodiment for a method 300 of managing a user's (or other entity's) storage quota. Method 300 may be performed by processing logic that may comprise hardware (circuitry, dedicated logic, etc.), software (such as is run on a general purpose computer system or a dedicated machine), or a combination of both. In one embodiment, the method 300 is performed by a host controller machine (e.g., by a virtualization manager running on a host controller machine, as depicted in FIGS. 1 and 2A).

At block 305 of method 300, a host controller machine assigns a storage quota to a user. As mentioned earlier, storage quotas may be assigned to other entities than users. Additionally, other types of quotas such as processor utilization quotas, memory utilization quotas, etc. may be assigned instead of or in addition to storage quotas. At block 310, the host controller machine divides the storage quota into storage quota portions. The storage quota may be divided into as many storage quota portions as the user has high level resources (e.g., virtual machines). Less than the entire storage quota may be assigned to the storage quota portions. For example, the host controller may keep some unassigned portion of the storage quota for allocation to future high level resources. The unassigned portion of the storage quota may be maintained in a free storage pool. At block 315, the host controller assigns each of the storage quota portions to one of the user's high level resources. Any portion of unassigned storage space is available in a free storage pool to later be assigned to a new or existing high level resource.

At block 320, the host controller receives a command to start a specified high level resource. The start command is one example of an event that may trigger reallocation of the storage quota between storage quota portions. The command may be received from a client or from an input/output device attached to a host machine. Alternatively, processing logic may identify some other event that may trigger a reallocation of the storage quota between storage quota portions. Examples of other events include changes in storage utilization of one or more high level resources, the addition of new high level resources, etc.

At block 325, the host controller machine determines whether the size of the storage quota portion assigned to the specified high level resource should be changed. This determination may be made automatically by the host controller without user input. Alternatively, this determination may be made based on user input. The storage quota portion may need to be increased in size, for example, if the storage quota portion is about to be filled up (e.g., if the storage portion was reduced to the amount of storage space actually used by the high level resource when the high level resource was last shut down). Alternatively, the storage quota portion may be reduced in size, for example, if there is a large amount of unused storage space assigned to the storage quota portion. If the size of the storage quota portion should be changed, the method continues to block 335. If the size of the storage quota portion does not need to be changed, the method proceeds to block 345.

At block 335, the host controller determines a new size for the specified high level resource's storage quota portion. This determination may be made automatically using one or more heuristics, or may be made based on user input. In one embodiment, the new size for the high level resource's storage quota portion is determined based on historical storage usage data for the high level resource. The historical storage usage data may be used, for example, to compute a prediction for the high level resources needs. At block 340, the host controller sets the specified high level resource's storage quota portion to the new size. At block 342, the host controller notifies a host that will host the high level resource of the high level resource's new storage quota portion size.

In one embodiment, at block 345, the host controller directs the host to start the high level resource. In one embodiment, the high level resource's storage quota portion may be further modified while the high level resource is active. Additionally, in one embodiment, the size of the high level resource's storage quota portion is reduced to the actual amount of storage space used by the high level resource when the high level resource is stopped.

Figure 4:
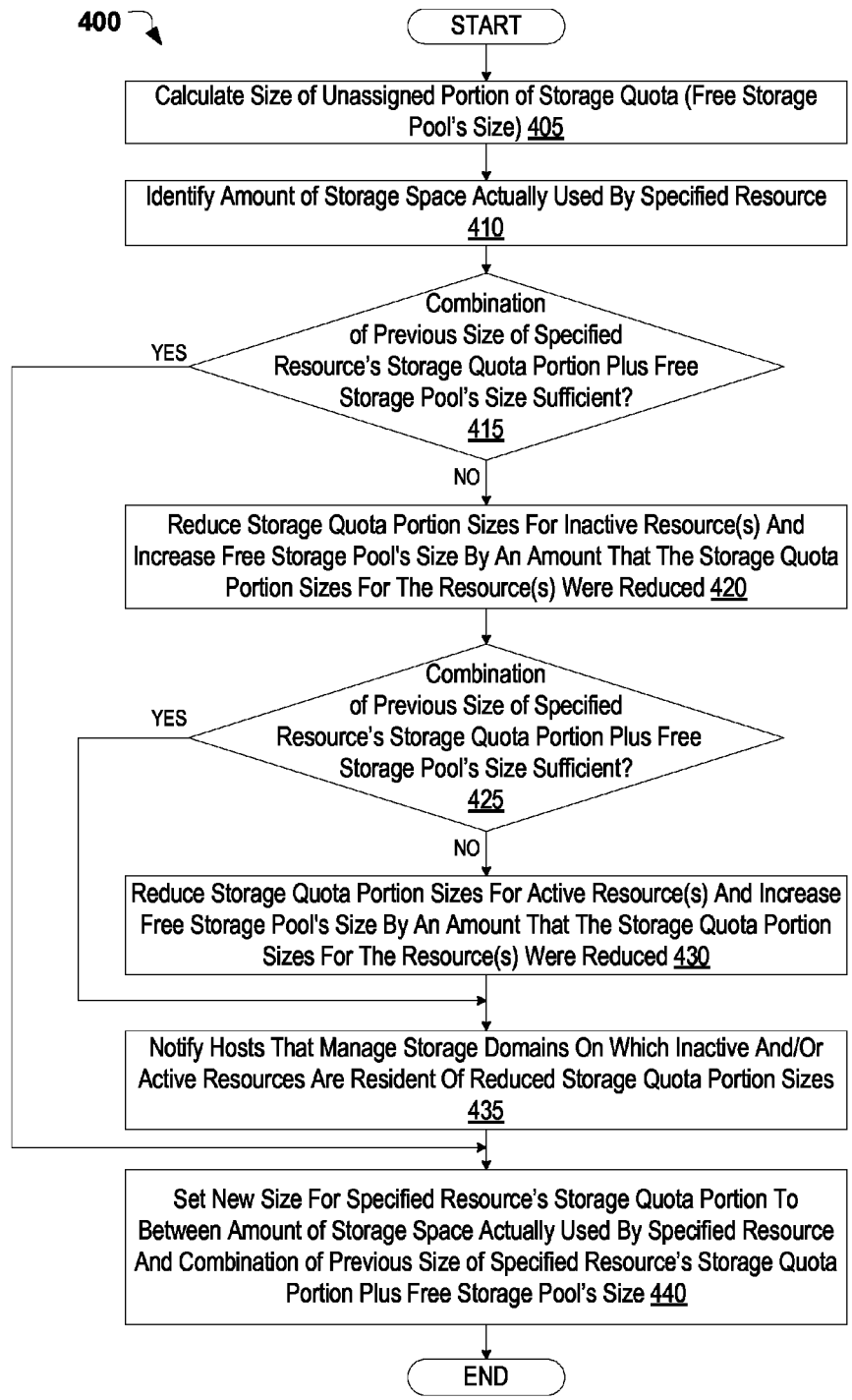
FIG. 4 is a flow diagram illustrating one embodiment for a method of setting the size of a specified high level resource's storage quota portion.

FIG. 4 is a flow diagram illustrating one embodiment for a method 400 of setting the size of a specified high level resource's storage quota portion. Method 400 may be performed by processing logic that may comprise hardware (circuitry, dedicated logic, etc.), software (such as is run on a general purpose computer system or a dedicated machine), or a combination of both. In one embodiment, the method 400 is performed by a host controller machine (e.g., by a virtualization manager running on a host controller machine, as depicted in FIGS. 1 and 2A). In one embodiment, method 400 is performed at block 335 of method 300.

At block 405 of method 400, a host controller calculates a size of an unassigned portion of storage quota (free storage pool). At block 410, the host controller identifies an amount of storage space actually used by a specified high level resource. At block 415, the host controller determines whether a combination of a previous size of the specified high level resource's storage quota portion plus the free storage pool's size is sufficient (large enough) for the high level resource. If the combination is not sufficient, the method continues to block 420. Otherwise, the method continues to block 440.

At block 420, the host controller reduces storage quota portion sizes for one or more inactive high level resources (e.g., VMs that are not currently running), and increases the free storage pool's size by an amount that the storage quota portion sizes of the high level resources were reduced. This is assuming that there are other high level resources that have unused space in their storage quota portions. If there is no available space to appropriate for the storage quota portion, the high level resource may not be permitted to grow. This may include querying hosts to determine which high level resources are inactive, and which high level resources have excess storage capacity. At block 425, the host controller determines whether the combination of the previous size of the specified high level resource's storage quota portion plus the free storage pool's size is sufficient. If the combination is not sufficient, the method continues to block 430. If the combination is sufficient, the method continues to block 435.

At block 430, the host controller reduces the storage quota portion sizes for one or more active high level resources, and increases the free storage pool's size by an amount that the storage quota portion sizes for the high level resources were reduced. In one embodiment, processing logic reduces the allocations for active and inactive high level resources in parallel. At block 435, the host controller notifies the hosts that manage inactive and/or active high level resources (and/or the hosts that manage the domains on which the high level resources are stored) of the reduced storage quota portion sizes.

At block 440, the host controller sets a new size for the specified high level resource's storage quota portion to between an amount of storage space actually used by the specified high level resource and the combination of the previous size of the specified high level resource's storage quota portion plus the free storage pool's size. The host controller may then notify a host of the specified high level resource of the new size.

Figure 5:
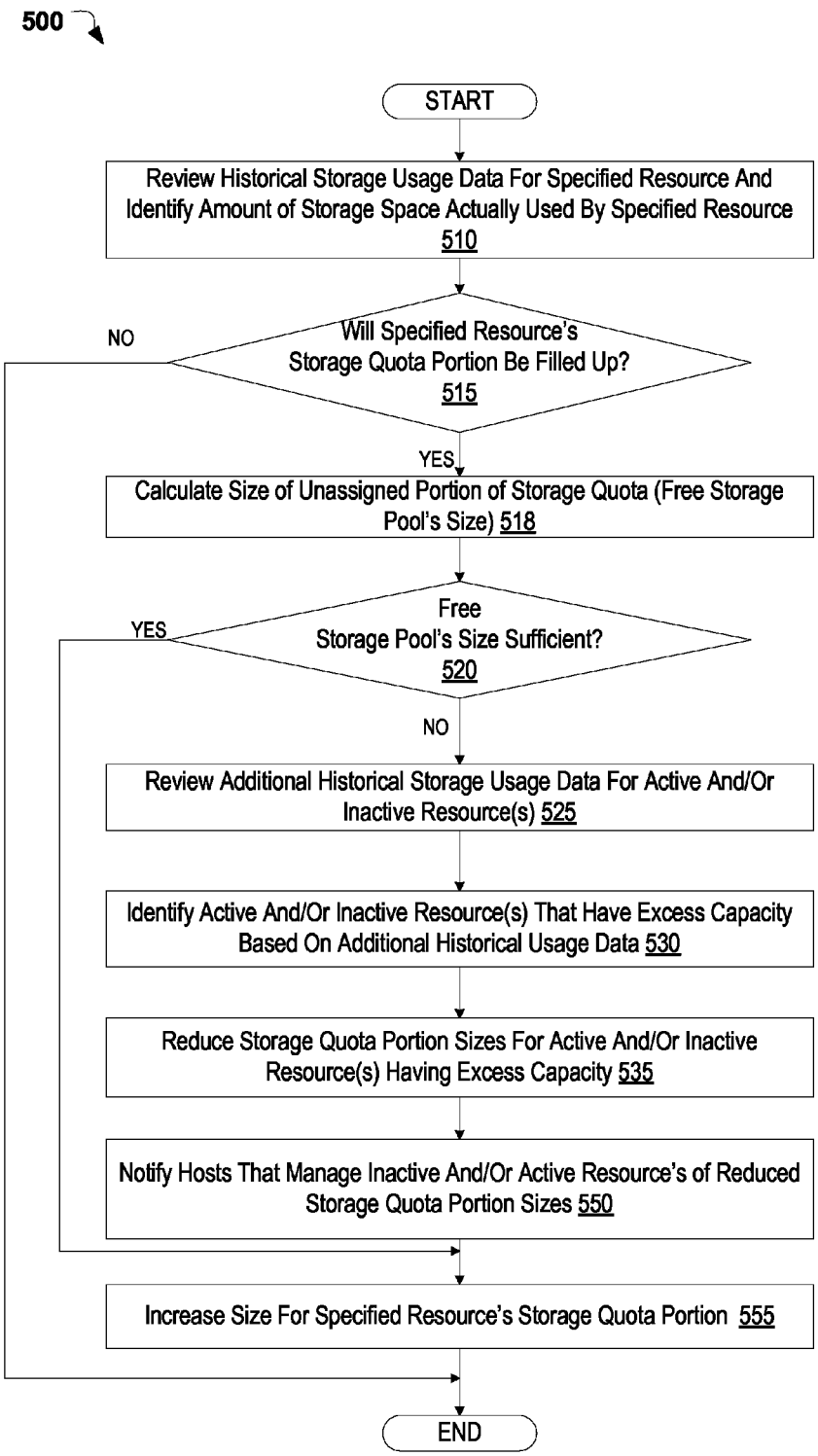
FIG. 5 is a flow diagram illustrating another embodiment for a method of setting the size of a specified high level resource's storage quota portion.

FIG. 5 is a flow diagram illustrating another embodiment for a method 500 of setting the size of a specified high level resource's storage quota portion. Method 500 may be performed by processing logic that may comprise hardware (circuitry, dedicated logic, etc.), software (such as is run on a general purpose computer system or a dedicated machine), or a combination of both. In one embodiment, the method 500 is performed by a host controller machine (e.g., by a virtualization manager running on a host controller machine, as depicted in FIGS. 1 and 2A). In one embodiment, method 500 is performed at block 335 of method 300.

At block 510 of method 500, a host controller reviews historical usage data for a specified high level resource and identifies an amount of storage space actually used by the specified high level resource based on the historical usage data. The host controller may obtain the historical usage data from a host that hosts the high level resource.

At block 515, the host controller determines whether the specified high level resource's storage quota portion is likely to be filled up. The host controller may determine whether the specified high level resource's storage quota portion will be filled up in a subsequent session, in a predetermined number of subsequent sessions, in a predetermined time period, or within some other threshold. The host controller may make this determination based on the review of the historical storage usage data for the specified high level resource. For example, by reviewing the historical usage data, the host controller may identify an average amount of extra disk space that is used by the high level resource each session. If the host controller determines that the high level resource's storage quota portion will be filled up, the method continues to block 518. Otherwise, the method ends.

At block 518, the host controller calculates a size of the user's free storage pool (the portion of the storage quota that is unassigned). At block 520, the host controller determines whether the user's free storage pool has enough space to satisfy the projected storage needs of the specified high level resource. If the free storage pool does not have sufficient size, the method continues to block 525. If the free storage pool is sufficiently large, the method continues to block 555.

At block 525, the host controller reviews historical usage data for active and/or inactive high level resources assigned to the user of the specified high level resource. At block 530, the host controller identifies active and/or inactive high level resources that have excess storage capacity based on the historical usage data. At block 535, the host controller reduces storage quota portion sizes for one or more of the active and/or inactive high level resources. In one embodiment, the host controller first checks inactive high level resources to determine whether enough storage capacity can be freed up from the inactive high level resources before checking the active high level resources. Therefore, the host controller may only begin reducing the sizes of storage quota portions for active high level resources if there is not enough excess capacity in the inactive high level resources storage quota portions.

At block 550, the host controller notifies the hosts that manage the active high level resources of the reduced storage quota portion sizes. At block 555, the host controller increases the size for the specified high level resource's storage quota portion. The host controller may then report the specified high level resource's increased storage quota portion size to the host that hosts the specified high level resource. Thus, the host controller is able to identify trends in the storage usage of each high level resource belonging to a user, and automatically reallocate storage space between the high level resources on demand.

Figure 6:
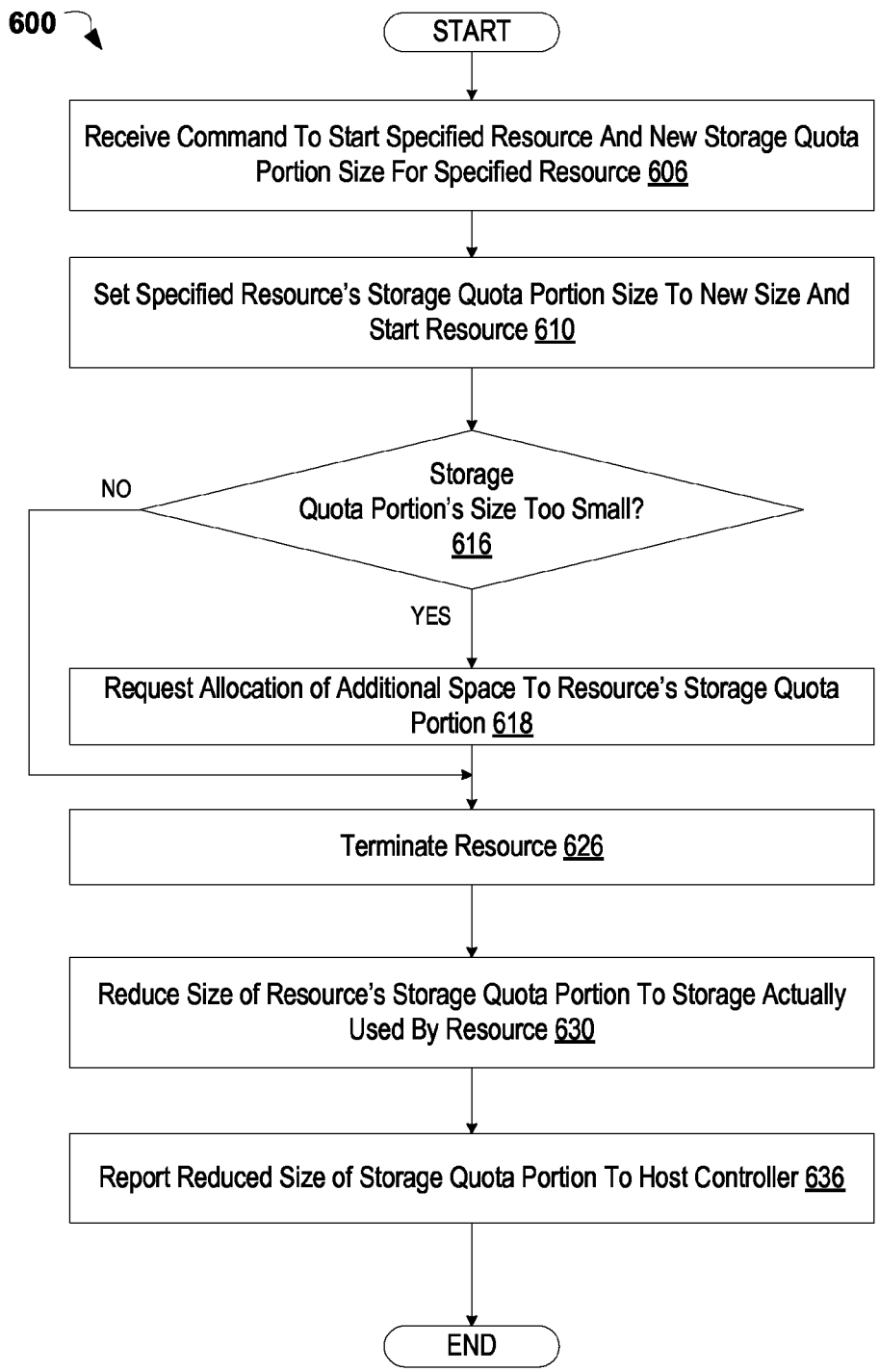
FIG. 6 is a flow diagram illustrating one embodiment for a method of managing a high level resource's storage quota portion.

FIG. 6 is a flow diagram illustrating one embodiment for a method 600 of managing a high level resource's storage quota portion. Method 600 may be performed by processing logic that may comprise hardware (circuitry, dedicated logic, etc.), software (such as is run on a general purpose computer system or a dedicated machine), or a combination of both. In one embodiment, the method 600 is performed by a host machine (e.g., by a management agent running on a host machine, as depicted in FIGS. 1 and 2B).

At block 606 of method 600 a host receives a command to start a specified high level resource from a host controller. The command may include an assignment of a new storage quota portion size for the specified high level resource. At block 610, the host sets the specified high level resource's storage quota portion size to the new size, and starts the high level resource.

During execution of the high level resource, the high level resource's storage quota portion may become full. At block 616, if the host detects that the size of the high level resource's storage quota portion is too small (e.g., that it is likely to fill up soon), the method continues to block 618 and the host requests allocation of additional space to the high level resource's storage quota portion. If at block 616 the host determines that the high level resource does not need additional storage space, the method eventually proceeds to block 626.

At block 626, the host terminates (e.g., shuts down) the high level resource. The high level resource is typically terminated when a user actively shuts the high level resource down. However, the high level resource may also be terminated automatically when certain criteria are satisfied (e.g., when the high level resource has been idle for a threshold amount of time). In one embodiment, the host terminates the high level resource automatically when there is no more quota left for the high level resource. Alternatively, the high level resource may simply be prevented from exceeding its quota. In another embodiment, the host allows the high level resource to exceed its quota by up to a threshold percentage (e.g., 5% of its quota). The system may also generate an alert when the high level resource's quota is about to be used up. At block 630, the host reduces the size of the high level resource's storage quota portion to the size of the storage actually used by the high level resource. This frees up the excess storage capacity for other high level resources. At block 636, the host reports the reduced size of the storage quota portion and the amount of storage actually used by the high level resource to the host controller. Alternatively, the high level resource's storage quota portion may be unchanged after termination.

Figure 7:
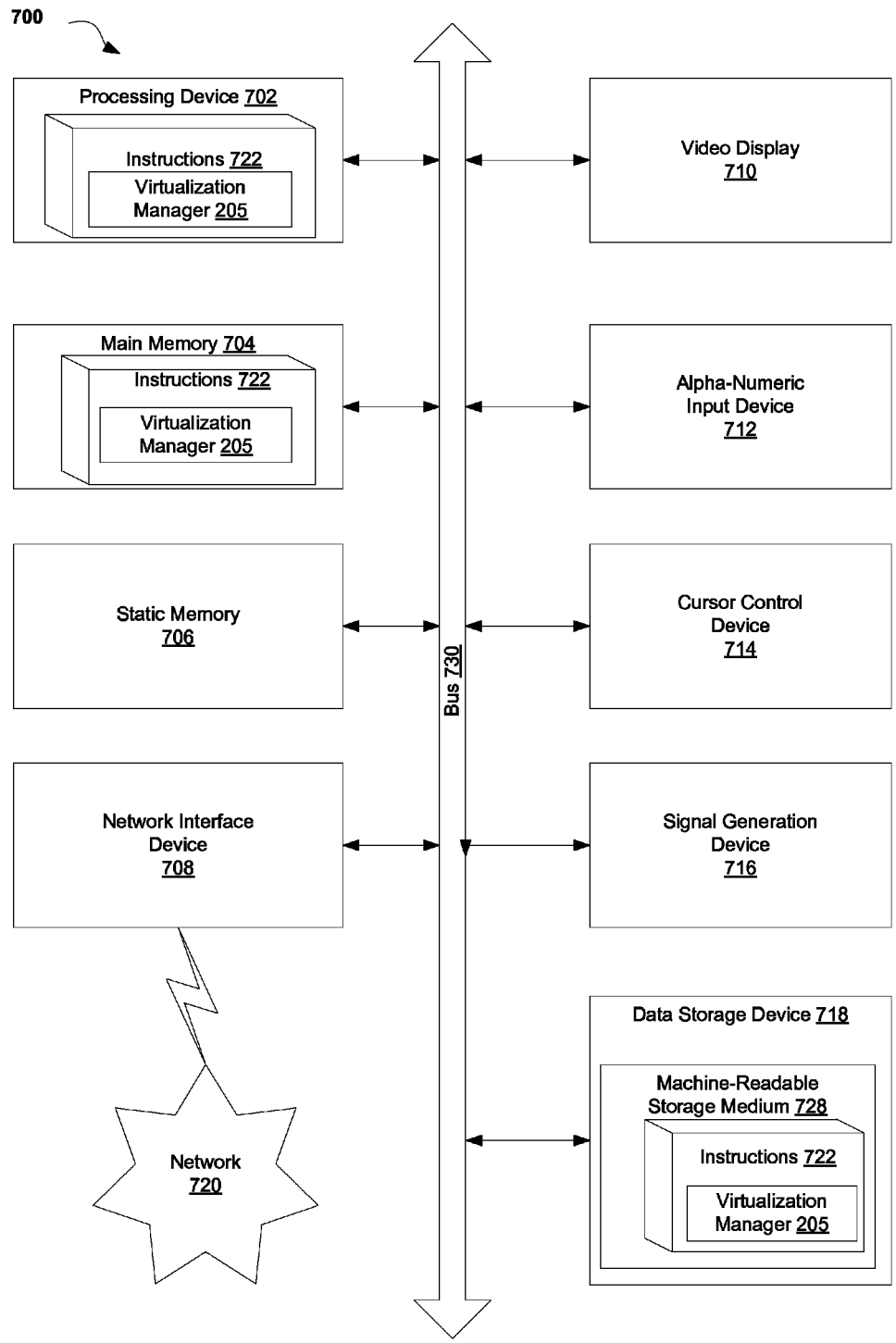
FIG. 7 illustrates a diagrammatic representation of a machine in the exemplary form of a computer system, which may be used with an embodiment of the invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media.

The machine-readable storage medium 728 may also be used to store instructions for a virtualization manager (e.g., virtualization manager 205 of FIG. 2A) and/or a software library containing methods that call a virtualization manager. Alternatively, machine-readable storage medium 728 may be used to store instructions for a management agent (e.g., management agent 250 of FIG. 2B) and/or a software library containing methods that call a management agent. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, techniques for managing high level resource allocation have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "assigning" or "dividing" or "receiving" or "determining" or "starting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
assigning a quota to an entity, the quota specifying a total amount of a low level resource that the entity is permitted to use for a plurality of targets;
dividing the quota into quota portions;
assigning, by a processing device, the quota portions to a plurality of high level resources assigned to the entity, wherein each of the plurality of high level resources uses low level resources of at least one of the plurality of targets, and wherein resource utilization for a high level resource of the plurality of high level resources is adjusted by a target of the plurality of targets up to a quota portion assigned to the high level resource without verification against the quota assigned to the entity; and
adjusting, without user input, the quota portions for one or more of the plurality of high level resources in response to changes in utilization requirements of the plurality of high level resources, wherein at least one quota portion of the plurality of quota portions is adjusted in view of historical low level resource usage data.

2. The method of claim 1, further comprising:
receiving a command to start a specified high level resource of the plurality of high level resources;
determining whether to change a size of the specified high level resource's quota portion before starting the specified high level resource; and
responsive to determining to change the size of the specified high level resource's quota portion, determining a new size for the specified high level resource's quota portion, and setting the size of the specified high level resource's quota portion to the determined new size.

3. The method of claim 2, wherein determining the new size for the specified-high level resource's quota portion comprises:
reviewing historical low level resource usage data for the specified high level resource;
determining that the specified high level resource's quota portion will be filled up based on the historical low level resource usage data; and
increasing the size of the specified high level resource's quota portion.

4. The method of claim 3, wherein determining the new size for the specified high level resource's quota portion further comprises:
reviewing additional historical low level resource usage data for one or more additional high level resources of the plurality of high level resources;
identifying that the one or more additional high level resources have excess capacity based on the additional historical low level resource usage data; and
reassigning the excess capacity from the one or more additional high level resources to the specified high level resource.

5. The method of claim 1, wherein adjusting a size of a specified high level resource's quota portion to a new size comprises:
calculating, for an unassigned portion of the quota, the unassigned portion's size, wherein the new size for the specified high level resource's quota portion is between an amount of the low level resource actually used by the specified high level resource and a combination of a previous size of the specified high level resource's quota portion plus the unassigned portion's size.

6. The method of claim 5, wherein determining the new size for the specified high level resource's quota portion further comprises:
determining that the combination of the previous size of the specified high level resource's quota portion plus the unassigned portion's size is insufficient for the specified high level resource;
reducing quota portion sizes for one or more inactive high level resources of the plurality of high level resources; and
increasing the size of the specified high level resource's quota portion based on an amount that the quota portion sizes for the one or more inactive high level resources were reduced.

7. The method of claim 6, further comprising:
determining that the increased size of the specified high level resource's quota portion is insufficient for the specified high level resource;
reducing quota portion sizes for one or more active high level resources of the plurality of high level resources; and further increasing the size of the specified high level resource's quota portion based on an amount that the quota portion sizes for the one or more active high level resources were reduced.

8. The method of claim 1, wherein the low level resource is storage, the quota is a storage quota, the plurality of quota portions are a plurality of storage quota portions, the plurality of targets are a plurality of storage targets, and the plurality of high level resources is a plurality of virtual machines.

9. A non-transitory computer readable medium including instructions that, when executed by a processing device, cause the processing device to perform operations comprising:
    assigning a storage quota to an entity, the storage quota specifying a total amount of storage space that the entity is permitted to use for a plurality of storage targets;
    dividing the storage quota into storage quota portions;
    assigning, by the processing device, the storage quota portions to a plurality of high level resources assigned to the entity, wherein each of the plurality of high level resources has data stored in at least one of the plurality of storage targets, and wherein resource utilization for a high level resource of the plurality of high level resources is adjusted by a target of the plurality of targets up to a quota portion assigned to the high level resource without verification against the quota assigned to the entity; and
    adjusting, without user input, storage quota portions for one or more of the plurality of high level resources in response to changes in utilization requirements of the plurality of high level resources, wherein at least one quota portion of the plurality of quota portions is adjusted in view of historical low level resource usage data.

10. The non-transitory computer readable medium of claim 9, the operations further comprising:
    receiving a command to start a specified high level resource of the plurality of high level resources;
    determining whether to change a size of the specified high level resource's storage quota portion before starting the specified high level resource; and
    responsive to determining to change the size of the specified high level resource's storage quota portion, determining a new size for the specified high level resource's storage quota portion, and setting the size of the specified high level resource's storage quota portion to the determined size.

11. The non-transitory computer readable medium of claim 10, wherein determining the new size for the specified high level resource's storage quota portion comprises:
    reviewing historical storage usage data for the specified high level resource;
    determining that the specified high level resource's storage quota portion will be filled up based on the historical storage usage data; and
    increasing the size of the specified high level resource's storage quota portion.

12. The non-transitory computer readable medium of claim 9, wherein adjusting a size of a specified high level resource's storage quota portion to a new size comprises:
    calculating, for an unassigned portion of the storage quota, the unassigned portion's size, wherein the new size for the specified high level resource's storage quota portion is between an amount of storage space actually used by the specified high level resource and a combination of a previous size of the specified high level resource's storage quota portion plus the unassigned portion's size.

13. The non-transitory computer readable medium of claim 12, wherein determining the new size for the specified high level resource's storage quota portion further comprises:
    determining that the combination of the previous size of the specified high level resource's storage quota portion plus the unassigned portion's size is insufficient for the specified high level resource;
    reducing storage quota portion sizes for one or more inactive high level resources of the plurality of high level resources; and
    increasing the size of the specified high level resource's storage quota portion based on an amount that the storage quota portion sizes for the one or more inactive high level resources were reduced.

14. The non-transitory computer readable medium of claim 9, wherein the plurality of high level resources is a plurality of virtual machines.

15. A computing device comprising:
    a memory; and
    a processing device connected to the memory, the processing device to:
        assign a quota to an entity, the quota specifying a total amount of a low level resource that the entity is permitted to use for a plurality of targets;
        divide the quota into quota portions;
        assign the quota portions to a plurality of high level resources assigned to the entity, wherein each of the plurality of high level resources uses low level resources of at least one of the plurality of targets, and wherein resource utilization for a high level resource of the plurality of high level resources is adjusted by a target of the plurality of targets up to a quota portion assigned to the high level resource without verification against the quota assigned to the entity; and
        adjust, without user input, quota portions for one or more of the plurality of high level resources in response to changes in utilization requirements of the plurality of high level resources, wherein at least one quota portion of the plurality of quota portions is adjusted in view of historical low level resource usage data.

16. The computing device of claim 15, wherein the processing device is further to:
    receive a command to start a specified high level resource of the plurality of high level resources;
    determine whether to change a size of the specified high level resource's quota portion before starting the specified high level resource; and
    responsive to determining to change the size of the specified high level resource's quota portion, determine a new size for the specified high level resource's quota portion, and set the size of the specified high level resource's quota portion to the determined new size.

17. The computing device of claim 16, wherein determining the new size for the specified high level resource's quota portion comprises:
    reviewing historical low level resource usage data for the specified high level resource;
    determining that the specified high level resource's quota portion will be filled up based on the historical low level resource usage data; and
    increasing the size of the specified high level resource's quota portion.

18. The computing device of claim 17, wherein determining the new size for the specified high level resource's quota portion further comprises:
- reviewing additional historical low level resource usage data for one or more additional high level resources of the plurality of high level resources;
- identifying that the one or more additional high level resources have excess capacity based on the additional historical low level resource usage data; and
- reassigning the excess capacity from the one or more additional high level resources to the specified high level resource.

19. The computing device of claim 15, wherein adjusting a size of a specified high level resource's quota portion to a new size comprises:
- calculating, for an unassigned portion of the quota, the unassigned portion's size, wherein the new size for the specified high level resource's quota portion is between an amount of the low level resource actually used by the specified high level resource and a combination of a previous size of the specified high level resource's quota portion plus the unassigned portion's size.

20. The computing device of claim 19, wherein determining the new size for the specified high level resource's quota portion further comprises:
- determining that the combination of the previous size of the specified high level resource's quota portion plus the unassigned portion s size is insufficient for the specified high level resource;
- reducing quota portion sizes for one or more additional high level resources of the plurality of high level resources; and
- increasing the size of the specified high level resource's quota portion based on an amount that the quota portion sizes for the one or more additional high level resources were reduced.

21. The computing device of claim 15, wherein the low level resource is storage, the quota is a storage quota, the plurality of quota portions are a plurality of storage quota portions, the plurality of targets are a plurality of storage targets, and the plurality of high level resources is a plurality of virtual machines.

* * * * *